United States Patent
Najork

(10) Patent No.: US 7,139,747 B1
(45) Date of Patent: Nov. 21, 2006

(54) SYSTEM AND METHOD FOR DISTRIBUTED WEB CRAWLING

(75) Inventor: Marc Alexander Najork, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1353 days.

(21) Appl. No.: 09/706,198

(22) Filed: Nov. 3, 2000

(51) Int. Cl.
  *G06F 17/30* (2006.01)
(52) U.S. Cl. .................. 707/3; 707/102; 709/219
(58) Field of Classification Search .............. 707/3, 707/1–2, 10, 104.1; 709/201–202
  See application file for complete search history.

(56) References Cited

U.S. PATENT DOCUMENTS

| | | | | |
|---|---|---|---|---|
| 5,974,455 | A * | 10/1999 | Monier | 709/223 |
| 6,182,085 | B1 * | 1/2001 | Eichstaedt et al. | 707/104.1 |
| 6,199,081 | B1 * | 3/2001 | Meyerzon et al. | 715/513 |
| 6,263,364 | B1 * | 7/2001 | Najork et al. | 709/217 |
| 6,321,265 | B1 * | 11/2001 | Najork et al. | 709/224 |
| 6,351,755 | B1 * | 2/2002 | Najork et al. | 715/501.1 |
| 6,377,984 | B1 * | 4/2002 | Najork et al. | 709/217 |

OTHER PUBLICATIONS

Heydon and Najork, Mercator: A Scalable, Extensible Web Crawler, *World Wide Web 2*, (Dec. 1999) 219-229.

Brin and Page, The Anatomy of a Large-Scale Hypertextual Web Search Engine, *In Proceedings of the Seventh International World Wide Web Conference*, (Apr. 1998) 107-117.

Burner, Crawling Towards Eternity: Building an Archive of the World Wide Web, *Web Techniques Magazine*, (May 1997) 2(5), Available website: http://www.webtechniques.com/archives/1997/05/burner.

* cited by examiner

*Primary Examiner*—Jeffrey Gaffin
*Assistant Examiner*—Mark Andrew X Radtke

(57) ABSTRACT

The present invention provides for the efficient downloading of data set addresses from among a plurality of host computers, using a plurality of web crawlers. Each web crawler identifies URL's in data sets downloaded by that web crawler, and identifies the host computer identifier within each such URL. The host computer identifier for each URL is mapped to the web crawler identifier of one of the web crawlers. If the URL is mapped to the web crawler identifier of a different web crawler, the URL is sent to that web crawler for processing, and otherwise the URL is processed by the web crawler that identified the URL. Each web crawler sends URL's to the other web crawlers for processing, and each web crawler receives URL's from the other web crawlers for processing. In a preferred embodiment, each web crawler processes only the URL's assigned to it, which are the URL's whose host identifier is mapped to the web crawler identifier for that web crawler. Each web crawler filters the URL's assigned to it by comparing them against a database of URL's already known by the web crawler and removing the already known URL's. If a URL is not already known to the web crawler, the data set corresponding to the URL is scheduled for downloading.

17 Claims, 9 Drawing Sheets

Compaq/DEC 9772-0298-999

SYSTEM AND METHOD FOR DISTRIBUTED WEB CRAWLING

The present invention relates to a system and method for distributed web crawling and, more particularly, to a web crawling system that uses multiple web crawlers to efficiently process addresses to be downloaded.

BACKGROUND OF THE INVENTION

Documents on interconnected computer networks are typically stored on numerous host computers that are connected over the networks. For example, so-called "web pages" may be stored on the global computer network known as the Internet, which includes the world wide web. Web pages can also be stored on Intranets, which are typically private networks maintained by corporations, government entities, and other groups. Each web page, whether on the world wide web or an Intranet, has a distinct address called its uniform resource locator (URL), which at least in part identifies the location or host computer of the web page. Many of the documents on Intranets and the world wide web are written in standard document description languages (e.g., HTML, XML). These languages allow an author of a document to create hypertext links to other documents. Hypertext links allow a reader of a web page to access other web pages by clicking on links to the other pages. These links are typically highlighted in the original web page. A web page containing hypertext links to other web pages generally refers to those pages by their URL's. A URL may be referred to more generally as a data set address, which corresponds to a web page, or data set. Links in a web page may refer to web pages that are stored in the same or different host computers.

A web crawler is a program that automatically finds and downloads documents from host computers in an Intranet or the world wide web. A computer with a web crawler installed on it may also be referred to as a web crawler. When a web crawler is given a set of starting URL's, the web crawler downloads the corresponding documents. The web crawler then extracts any URL's contained in those downloaded documents. Before the web crawler downloads the documents associated with the newly discovered URL's, the web crawler needs to find out whether these documents have already been downloaded. If the documents associated with the newly discovered URL's have not been downloaded, the web crawler downloads the documents and extracts any URL's contained in them. This process repeats indefinitely or until a predetermined stop condition occurs. This process is demanding for a single web crawler due to the large number of URL's to download and process. As of 1999 there were approximately 800 million web pages on the world wide web and the number is continuously growing. Even Intranets can store millions of web pages.

SUMMARY OF THE INVENTION

The present invention provides for the efficient downloading of data set addresses from among a plurality of host computers, using a plurality of web crawlers. Each web crawler identifies URL's in data sets downloaded by that web crawler, and identifies the host computer identifier within each such URL. The host computer identifier for each URL is mapped to the web crawler identifier of one of the web crawlers. If the URL is mapped to the web crawler identifier of a different web crawler, the URL is sent to that web crawler for processing, and otherwise the URL is processed by the web crawler that identified the URL.

Each web crawler sends URL's to the other web crawlers for processing, and each web crawler receives URL's from the other web crawlers for processing. Each web crawler processes only the URL's assigned to it, which are the URL's whose host identifier is mapped to the web crawler identifier for that web crawler. Each web crawler filters the URL's assigned to it by comparing them against a database of URL's already known by the web crawler. If a URL is not already known to the web crawler, the data set corresponding to the URL is scheduled for downloading; otherwise, the URL is ignored.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
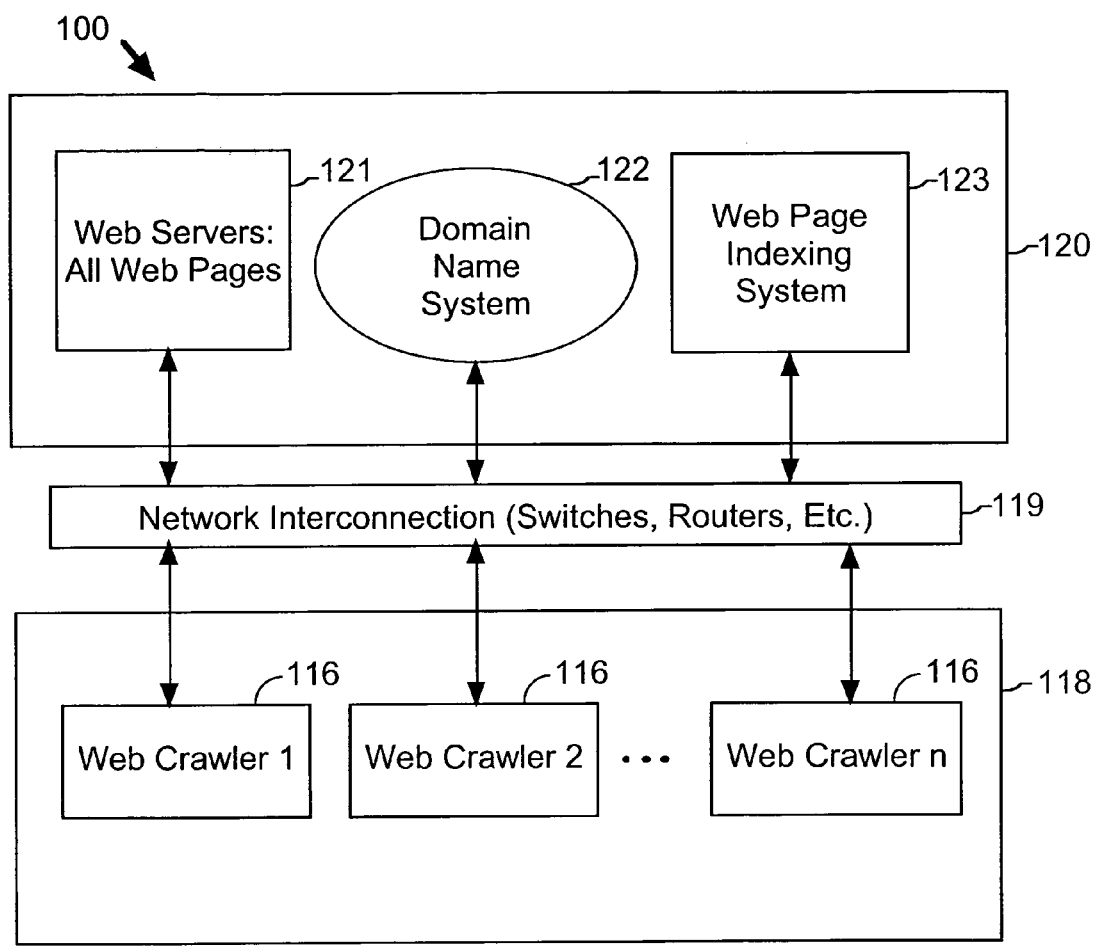
FIG. 1 is a block diagram of a web crawler system in accordance with an embodiment of the invention.

Referring to FIG. 1, there is shown an embodiment of a distributed computer system 100. The distributed computer system 100 includes a web crawler system 118 connected to a network 120 through a network interconnection 119. The network 120 may be a global communication network, such as the Internet, or a private network, sometimes called an Intranet. Examples of network interconnection 119 include switches, routers, etc.

The network 120 includes web servers 121 and may optionally include a service known as a domain name system 122. It may also optionally include a web page indexing system 123. The web servers 121 store web pages. The domain name system 122 provides the mapping between Internet Protocol (IP) addresses and host names. Each site participating in the domain name system 122 maintains its own database of information and runs a server program that other systems across the Intranet or Internet can query. The domain name system provides the protocol that allows clients and servers to communicate with each other. Any application may look up the IP address (or addresses) corresponding to a given host name or the host name corresponding to a given IP address in the domain name system 122. An application accesses the domain name system 122 through a resolver. The resolver contacts one or more name servers to perform a mapping of a host name to the corresponding IP address, or vice versa. A given host name may be associated with more than one IP address because an Intranet or Internet host may have multiple interfaces, with each interface of the host having a unique IP address.

The web page indexing system 123 includes an index of words used on the world wide web, or the Intranet, and addresses of the web pages that use each word. Such indexing systems are maintained by various search engines, such as the AltaVista search engine. The domain name system 122 and the web page indexing system 123 may be accessed by the web crawlers 116 in the process of downloading web pages from the world wide web.

The web crawler system 118 is made up of n web crawlers, where n is an integer larger than one. A typical web crawler system 118 may contain, for example, four web crawlers. The web crawlers 116 in the web crawler system 118 communicate via a communications network such as a local area network, or the Internet. In addition, there may be a separate computer (not shown) for controlling the communication between the web crawlers in the web crawler system 118.

Figure 2:
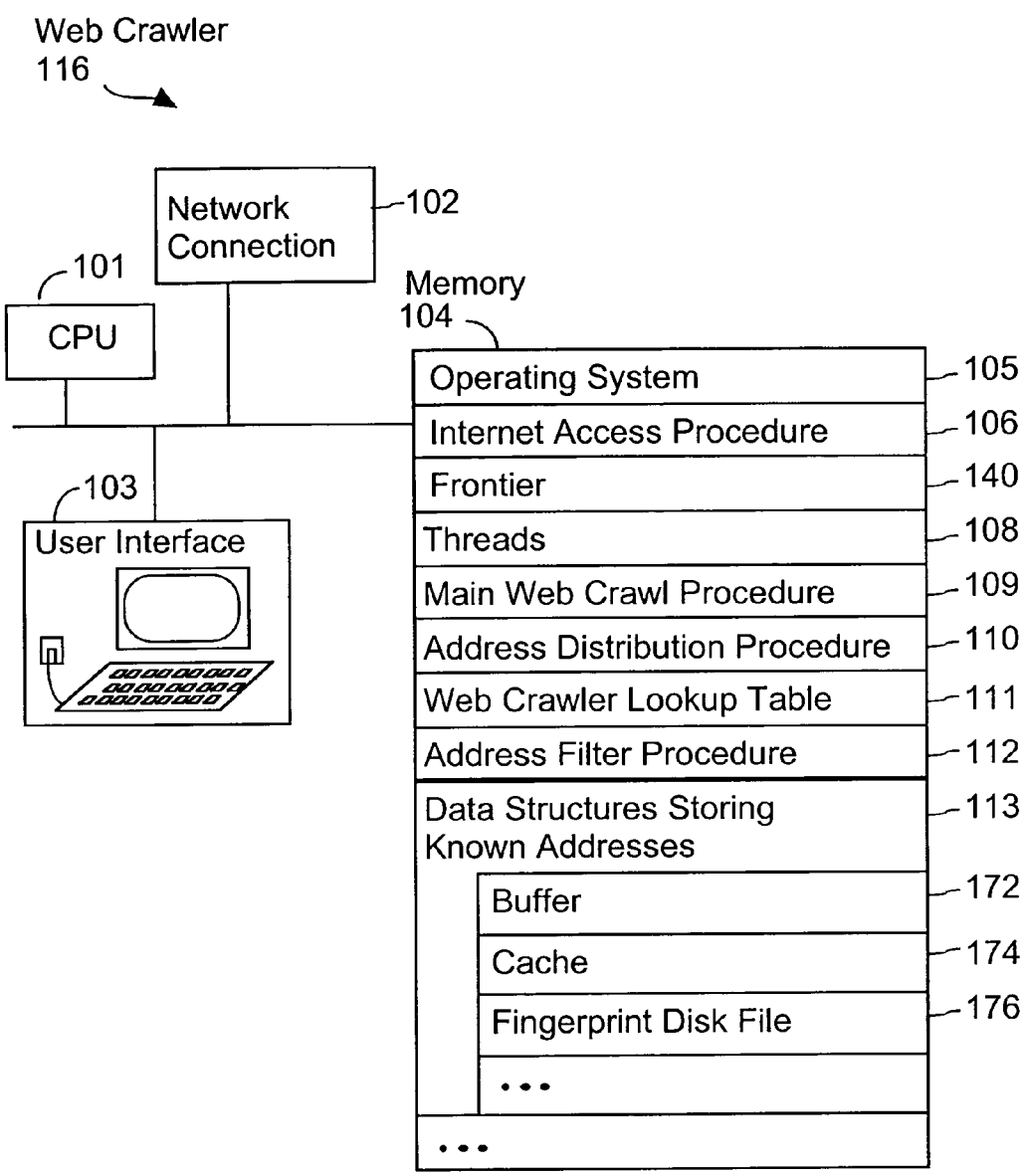
FIG. 2 is a block diagram of a web crawler in accordance with an embodiment of the present invention.

An exemplary embodiment of a web crawler 116 is shown in FIG. 2. The web crawler 116 includes one or more CPUs 101, a communications interface or network connection 102, memory 104. The web crawler may optionally include a user interface 103, or the web crawler may be accessed by a user interface or other facility remotely located on another computer. In some implementations two network connections or communication interfaces may be needed, one for downloading web documents, and another for communicating with the other web crawlers. The memory 104 includes:

an operating system 105;

an Intranet/Internet access procedure 106 for fetching web pages as well as communicating with the domain name system 122 (FIG. 1);

a frontier 140 for storing URL's or representations of URL's that will be downloaded by the web crawler 116;

threads 108 for downloading web pages from the servers 121, and processing the downloaded web pages;

a main web crawler procedure 109 executed by each of the threads 108;

a URL address distribution procedure 110 executed by each of the threads 108 to identify the URL's in a downloaded web page, and to determine which web crawler is associated with each URL;

a web crawler lookup table 111 for storing the addresses corresponding to the web crawler identifiers of the other web crawlers in the system;

a URL address filter procedure 112 executed by each of the threads 108 to filter the URL's assigned to this web crawler for processing, and to determine which URL's are new and therefore should be scheduled for downloading; and data structures 113 for storing all of the known addresses associated with the web crawler.

The data structures 113 for storing the known data set addresses may include:

a buffer 172 for storing the addresses (and/or fingerprints of addresses) identified as potentially being addresses unknown to the web crawler;

an optional cache 174, for storing frequently encountered addresses (used in an embodiment described with reference to FIG. 8); and a disk file (or set of disk files) 176 for storing addresses (and/or fingerprints of addresses) known to the web crawler.

While these are the data structures used in a preferred embodiment to store known data set addresses, and/or the fingerprints of those addresses, other data structures may be used to store this information in other embodiments.

Main Web Crawler Procedure

In the exemplary embodiment, each web crawler uses multiple threads to download and process documents. The web crawler 116 is given a set of initial URL's and begins downloading documents using those URL's. Various data structures may be used to keep track of which documents (web pages) the threads should download and process, but those particular data structures are not the subject of the present invention. Rather, the present invention concerns the methodology and data structures used to determine the URL's to be processed by each web crawler in the web crawler system.

Figure 3:
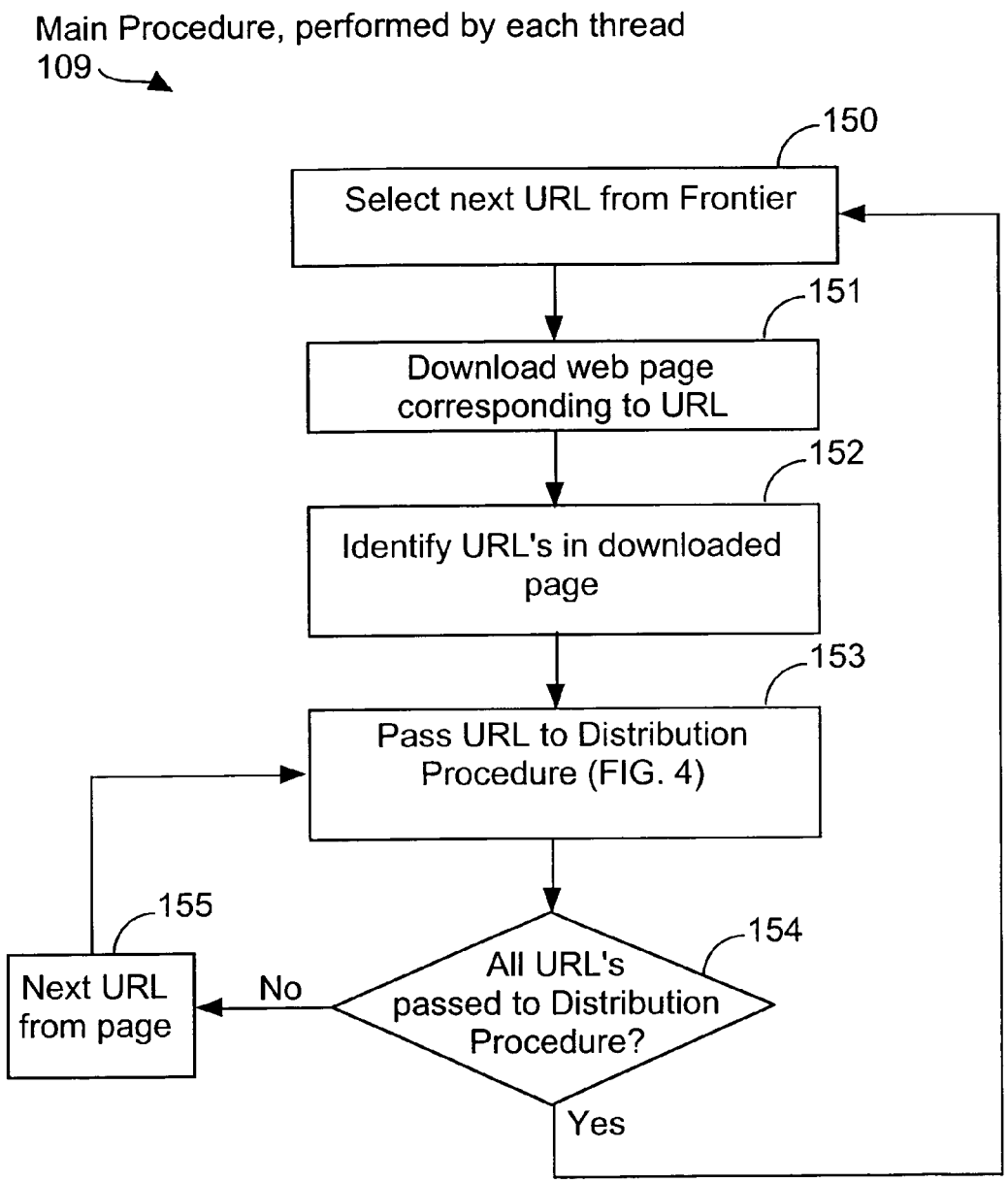
FIG. 3 is a flow chart of a main web crawling procedure executed by each of a plurality of threads in an exemplary embodiment of the invention.

Each thread executes a main web crawler procedure 109, which will be now described with reference to the flow chart shown in FIG. 3 and the block diagram of FIG. 2. The web crawler thread determines the data set address of the next document, or data set, to be downloaded, typically by retrieving the data set address from the frontier 140 (step 150). The frontier 140 is a queue that stores the data set addresses (URL's) to be downloaded. The thread then downloads the document corresponding to the URL (step 151), and processes the document. The processing may include indexing the words in the document so as to make the document accessible via a search engine. However, the only processing of the document that is relevant to the present discussion is that the main procedure identifies URL's in the downloaded document (step 152) that are candidates for downloading and processing. Typically, these URL's are found in hypertext links in the document being processed.

Each identified URL is passed to the address distribution procedure in step 153 to determine which web crawler in the web crawler system should process the URL. If the address distribution procedure determines that the identified URL should not be processed by the web crawler running the procedure, the URL is sent to the appropriate web crawler for processing. In the meantime, the main procedure continues to identify URL's and pass URL's to the address distribution procedure until all URL's from the downloaded page have been processed (steps 154 and 155). When all URL's have been passed to the address distribution procedure, the next address is retrieved from the frontier 140 (step 150), and then the procedure described above repeats. The main web crawler procedure continues to run as long as there are URL's in the frontier for it to process, or until a predetermined stop condition occurs.

Address Distribution Procedure

Figure 4:
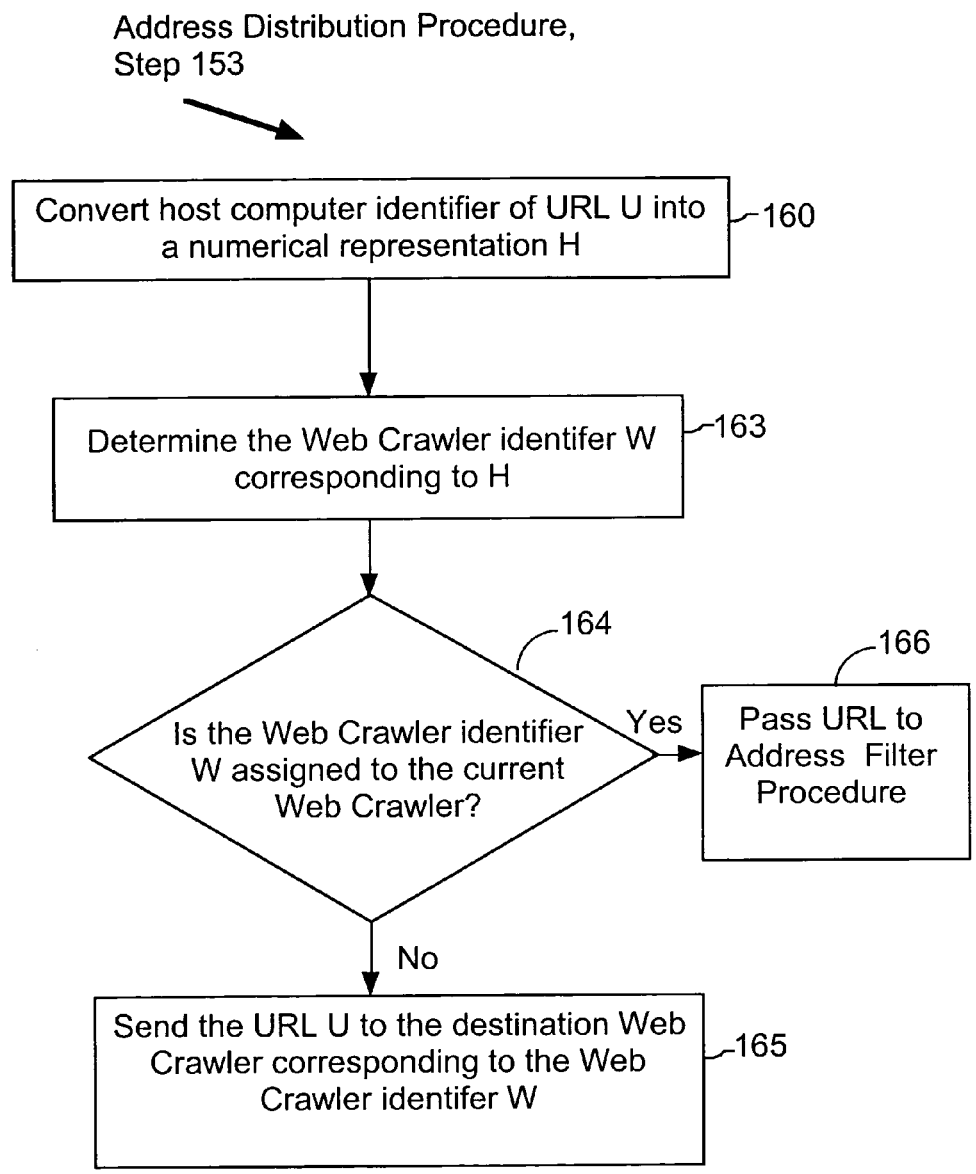
FIG. 4 is a flow chart of an address distribution procedure used in an exemplary embodiment of the invention.

An exemplary embodiment of the address distribution procedure invoked by the main web crawler procedure is described next with reference to the flow chart shown in FIG. 4 and the block diagram in FIG. 2. It is preferable to assign URL's to each web crawler by host name. Each web crawler is then responsible for processing only the addresses associated with its assigned set of hosts. Assigning all the URL's from each host to one particular web crawler makes it more practical to enforce "politeness" policies, which dictate restrictions on how often the web crawler system will download pages from any one host, and it avoids having to replicate per-host information across multiple web crawlers.

The first step of the URL distribution procedure is to convert the part of the specified URL U that identifies the web page's host computer, called the host computer identifier, into a numeric representation H (step 160). In one embodiment, the "host computer identifier" is a symbolic name, such as "www.compaq.com," while in another embodiment, the "host computer identifier" is an IP address, such as 161.114.19.252. Which of these two embodiments is used determines the interpretation of "politeness." For instance, if the system distributes URL's based on symbolic host names, then it is possible that the web crawler system will distribute two different host names that happen to resolve to the same IP address to two different web crawlers, in which case those two web crawlers may send requests in parallel to the machine at that IP address. If the system distributes URL's based on the host IP address, only one web crawler will send requests to the host computer at that IP address.

In the preferred embodiment, an intermediate value V is first produced by converting the host computer identifier into a fixed length numeric representation, or "hash value." The hash value, also herein called the fingerprint, may be generated by applying a predefined hash function to the specified URL U's host computer identifier. The only requirement for the hash function is that it should spread the URL's evenly over the available hash buckets. Many suitable hash functions are known to those skilled in the art, including checksum functions and fingerprint functions, and thus are not described here.

After the host identifier of the specified URL U has been converted into the intermediate value V, the web crawler generates the representation of the host computer identifier by computing a function of the host computer identifier whose result is an integer value that is a member of a set of n predefined distinct values, where n is the number of web crawlers in the web crawler system. For instance, the representation of the host computer identifier may be generated by computing V modulo n. The host computer representation H which is the result of computing V modulo n will be an integer between 0 and n−1. In alternate embodiments, other methods may be used to map the host identifier into a numerical representation H. One such alternative method is to divide the numeric range of all possible intermediate values V into n sub-ranges, where the range of values is preferably divided so as to evenly spread the possible values of V over the n sub-ranges. Each value V is then mapped to an integer between 0 and n−1 by determining which of the n sub-ranges it falls in. For instance, if the hash function used to generate V returns a value between 0 and X−1, the web crawler identifier may be computed as follows:

if $0 \leq V < (1/n)X$ then return 0
if $(1/n)X \leq V < (2/n)X$ then return 1
if $(2/n)X \leq V < (3/n)X$ then return 2
. . .
if $((n-1)/n)X \leq V < X$ then return n−1

After the host computer representation H has been generated, the address distribution procedure determines the web crawler identifier corresponding to H. In the preferred embodiment, each web crawler in the web crawler system is assigned a web crawler identifier W. The web crawler identifier may be an integer between zero and n−1, where n is the number of web crawlers in the web crawler system. Therefore, in this embodiment, the host computer representation H is equal to its corresponding web crawler identifier W. Other embodiments may include a procedure to map the host computer representation H to the web crawler identifier W to ensure an even distribution of URL's across the plurality of web crawlers. If the web crawler identifier W is assigned to the current web crawler (i.e., the web crawler running the address distribution procedure), then the URL U is passed to the address filter procedure, which is described below (step 166). If the web crawler identifier W is not assigned to the current web crawler, the URL U is sent to the destination web crawler corresponding to the web crawler identifier W (step 167).

Other methods of generating a host computer representation and mapping it to the web crawler identifier such that there is an even spreading of host names (host computer identifiers) over the web crawlers in the web crawler system may be apparent to those skilled in the art.

In order to send the URL U to the destination web crawler, the sending web crawler transmits the URL U to the destination web crawler at an address specified by the web crawler lookup table 111. The web crawler lookup table 111 may be part of a configuration file used to determine the configuration of the web crawler during initialization of the system. In a preferred embodiment, during initialization of the web crawler system each web crawler opens a connection to every other web crawler in the system, and thereafter transmits URL's to the other web crawlers over the open connections. The "open connections" are operating system or other software constructs that generate message packets that are sent to the destination web crawlers via the network connection 102. Each such message packet contains the information (e.g., a URL) being sent and has a destination address equal to the IP address of the web crawler to which the URL is being sent.

Address Filter Procedure

Figure 5:
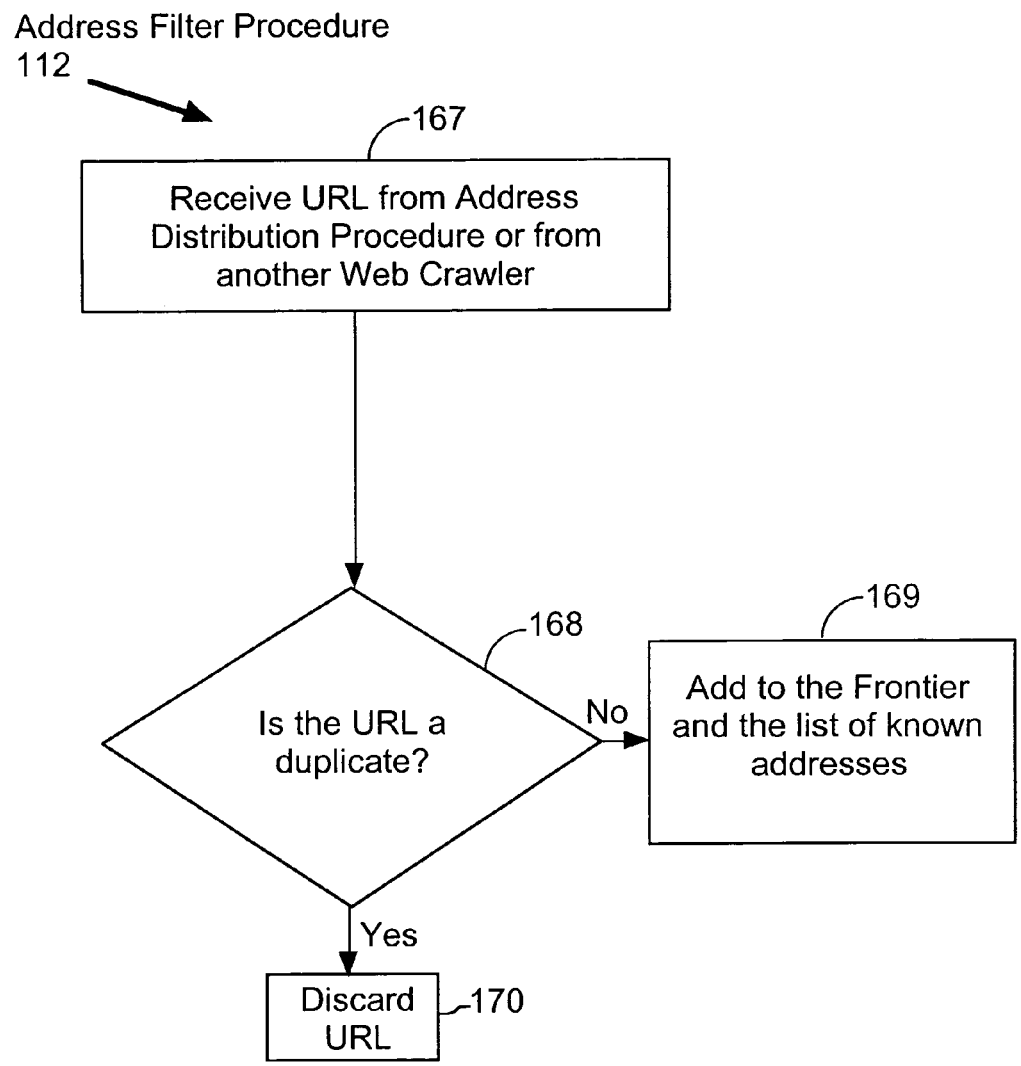
FIG. 5 is a flow chart of an address filter procedure used in an exemplary embodiment of the invention.

The address filter procedure is described with reference to the flow diagram in FIG. 5 and the block diagram in FIG. 2. The address filter procedure receives URL's sent from other web crawlers and from the address distribution procedure as described above (step 167). The address filter procedure determines if the URL U is a duplicate URL that has already been downloaded by the web crawler or has already been scheduled for downloading (step 168). This is preferably done by comparing the URL to a list of all stored URL's that are known to the web crawler. The list of known URL's is stored in a set of data structures 113, described in more detail below, designed to facilitate efficient lookup. If the URL is a duplicate (168-Yes), it is discarded (step 170). If the URL is not a duplicate (168-No), it is added to the frontier 140 for downloading by the web crawler and to the list of the addresses known to the web crawler (step 169). The data structures for the frontier and for the list of addresses known to the web crawler are described below.

Figure 6:
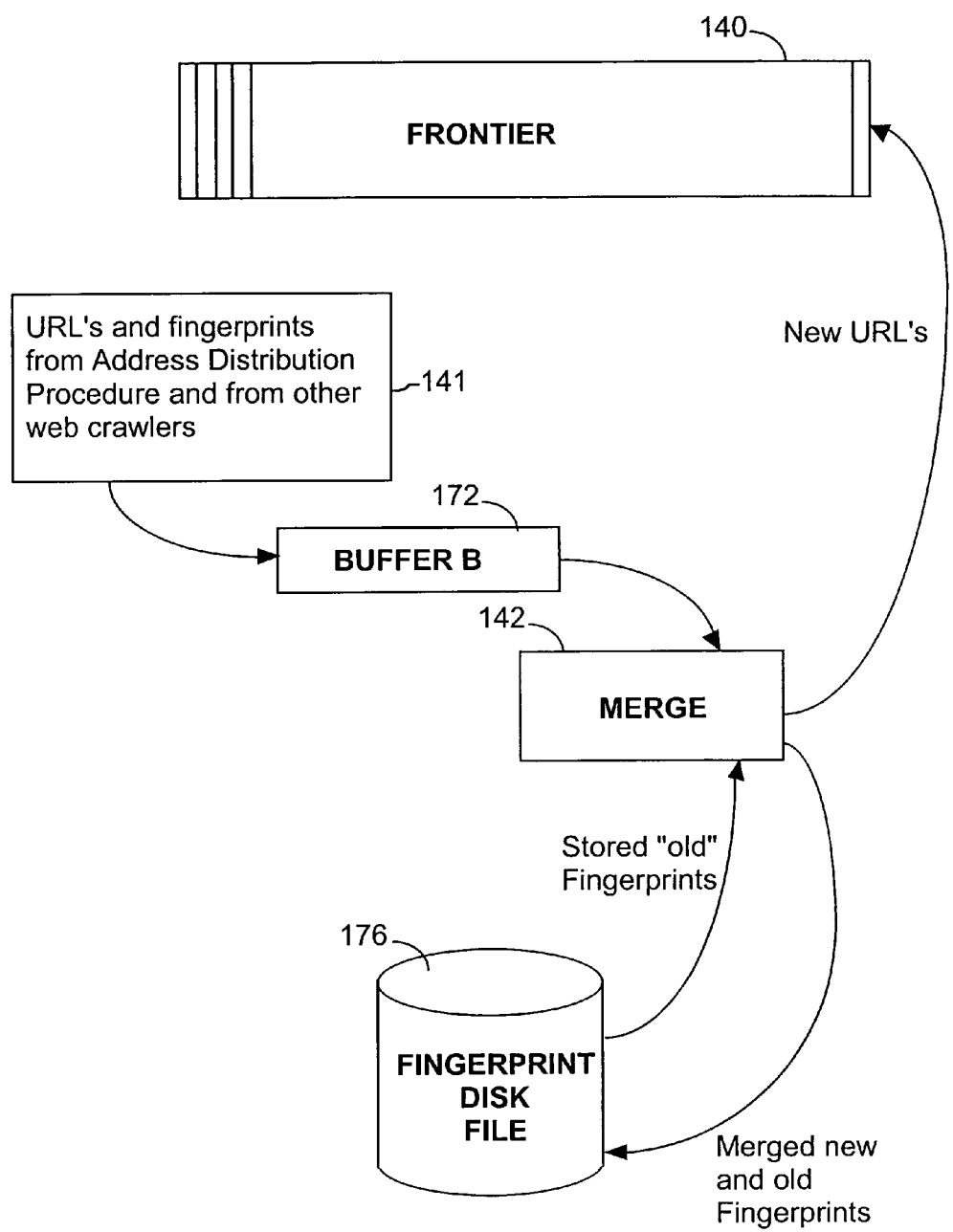
FIG. 6 is a block diagram of the data flow of an embodiment of the address filter procedure.

The diagram in FIG. 6 shows an exemplary embodiment of the data structures used to determine whether the specified URL is a duplicate. Preferably, a fingerprint N is generated to represent the entire specified URL, not just the host computer identifier. Next, a lookup is performed to see if N is already stored in a buffer B (172), which stores the fingerprints of recently added URL's, as well as the corresponding URL's. If N is already stored in buffer B 172, it has already been scheduled for downloading, and therefore no further processing of the URL U is needed (i.e., the new copy of the URL U is discarded). If N is not stored in buffer B 172, it may be new (although it may already be stored in the fingerprint disk file 176), and therefore N and the corresponding URL U are added to buffer B 172. Other URL's are processed until buffer B 172 is full.

When the buffer B 172 becomes full, it must be merged with the fingerprint disk file 176. The fingerprints in buffer B 172 are first sorted so that the fingerprints are in order. After ordering, the buffer B 172 is then merged with the fingerprint disk file 176, where only fingerprints corresponding to new URL's are added to the disk file 176. During the merge, the fingerprint disk file 176 is searched to determine whether each fingerprint from buffer B is located in the disk file. Each fingerprint located in the disk file is discarded. Each fingerprint not located in the disk file is added to the disk file 176, and the corresponding URL is added to the frontier for downloading of the corresponding web page document. When the merge process is completed, the contents of buffer B 172 are deleted. The process of merging buffer B 172 into the disk file 176 is a relatively time-consuming operation. Therefore buffer B 172 is typically made fairly large so as to minimize the frequency of such merge operations. In this embodiment, buffer B 172 and the disk file 176 are the data structures 113 (FIG. 2) used to store known addresses.

Figure 7:
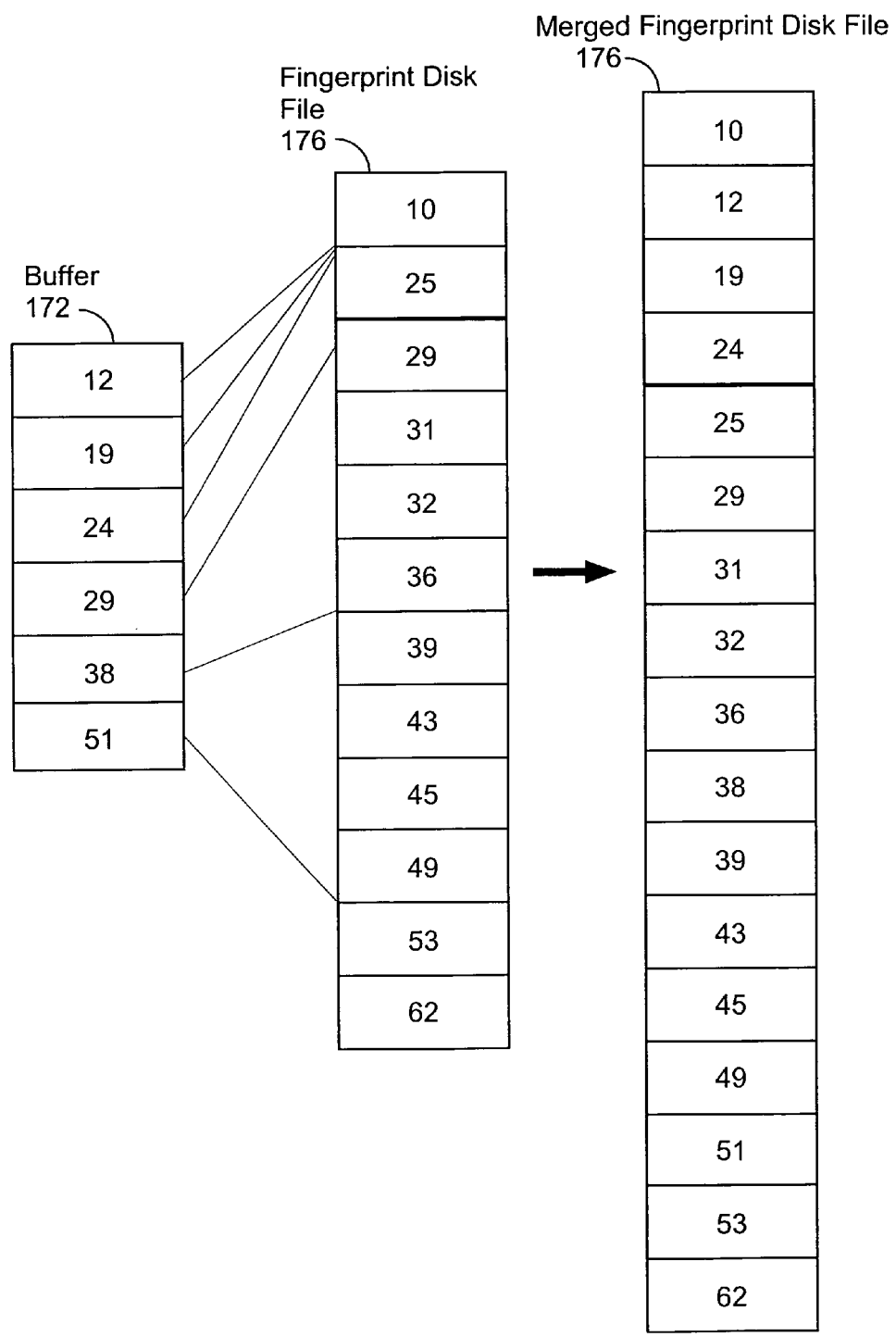
FIG. 7 is a block diagram of the data structures used to store the addresses known to the web crawler.

During the merge process, which is an ordered merge, each fingerprint from buffer B not found in the disk file must be inserted in the fingerprint disk file 176 in the proper location, as illustrated in FIG. 7, so that the disk file 176 remains ordered. This requires the disk file to be completely re-written. To avoid this lengthy rewrite process, in a preferred embodiment, the fingerprint disk file may be sparsely-filled, using open addressing. For this embodiment, the fingerprint disk file represents a hash table, with a substantial proportion of the table, for example 50% or 75%, being empty entries or "holes."

In this embodiment, in order to determine whether a fingerprint from buffer B is in the disk file, the hash of the fingerprint is computed. In one embodiment, a prefix of the fingerprint is used for the hash value. The hash value is the starting position for searching through the fingerprint disk file. The disk file is searched sequentially, starting at the starting position, for either a match or a hole. If a hole is found, the fingerprint from buffer B is stored in that hole; if a match is found, it is discarded. Thus, there is only one write to the disk file for each fingerprint not already present in the disk file, and the size of the disk file is not a factor in the merge time. When the disk file becomes too full—for example, when only 25% of the slots in the disk file are holes—the file must be completely rewritten into a new, larger file. For example, the new file may be doubled in size, in which case the amortized cost of maintaining the file is constant per fingerprint in the hash table. It will be appreciated that the use of a sparsely-filled disk file drastically reduces the disk re-writing required during a merge.

In one embodiment, the disk file may be divided into sparse sub-files, with open-addressing used for each sub-file. An index may be used to identify the range of fingerprint hash values located in each sub-file, or an additional hash table may be used to map fingerprints to the various sub-files. When a sub-file becomes too full, it may be re-written into a new, larger file, but the entire disk file need not be re-written.

The disk file (or each sub-file) is ordered, so that all fingerprints from the same host will be likely stored in either the same sub-file, or at contiguous memory locations within the disk file. Because URL's located on a given web page often have the same host, this efficient addressing scheme can significantly improve the speed of the merge process.

When a new fingerprint is to be added to the disk file during the merge, often the buffer used for the merge operation will already contain the disk page on which that fingerprint will be stored. This will occur when the previous fingerprint added to the disk file was from the same host as the new fingerprint, and consequently would likely have been stored on the same disk page as the new fingerprint.

Figure 8:
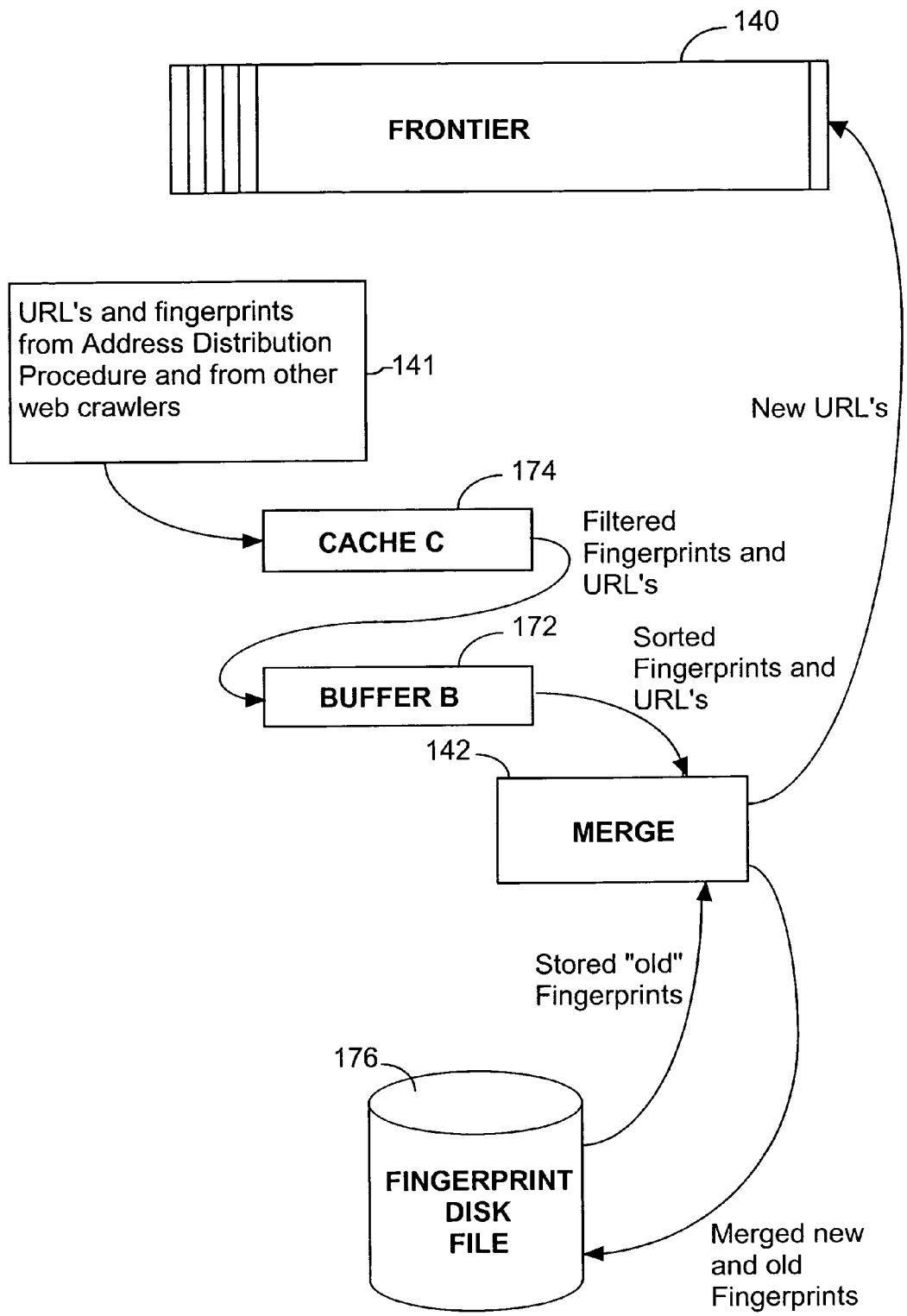
FIG. 8 is a block diagram of the data flow of an alternate embodiment of the address filter procedure.

In an alternative embodiment, illustrated in FIG. 8, in addition to buffer B 172, a cache C 174 of "popular" URL's is included. Cache C, in this embodiment, is one of the data structures 113 (FIG. 2) for storing known addresses. The fingerprint for each URL from the address distribution procedure or from another web crawler 141 is first compared to fingerprints in cache C 174, to see whether the URL is a "popular" URL that has already been downloaded (or scheduled for downloading) and therefore need not be processed any further. If the fingerprint is not in cache C 174, the address filter then goes on to compare the fingerprint to the fingerprints in buffer B 172, as discussed previously. Use of the cache C 174 significantly reduces the rate at which the buffer B 172 is filled with fingerprints, which reduces the frequency of merges with the disk file and thus improves the efficiency of the address filter.

The cache C is updated according to an update policy. When, according to the update policy, a new fingerprint must be added to cache C, and cache C 174 is full, a fingerprint is evicted from cache C 174. The fingerprint to be evicted at any one time is determined using an appropriate eviction policy, such as a least recently used eviction policy, a round robin eviction policy or a clock replacement eviction policy.

A new fingerprint is added to cache C 174 according to an update policy. The following are examples of update policies. A fingerprint corresponding to a URL may be added to cache C 174, following the comparison of the fingerprint to the contents of cache C 174, whenever that fingerprint is not already contained in cache C 174. Thus, under this update policy, cache C 174 is simply a cache of fingerprints for recently-identified URL's. Alternatively, a fingerprint may be added to cache C 174 following the comparison of a fingerprint to the contents of buffer B 172 whenever that fingerprint is not contained in cache C 174, but is contained in buffer B 172. In this case, cache C 174 is a cache of fingerprints for URL's which have been identified more than once recently. Or, a fingerprint may be added to cache C whenever that fingerprint is not contained in cache C 174 and is not contained in buffer B 172. Cache C 174 in this case is a cache of fingerprints for URL's which have been identified only once recently. Finally, a fingerprint may be added to cache C 174 during the merge when the fingerprint is found to have been previously stored in the fingerprint disk file 176. For this policy, cache C 174 is a cache of fingerprints for URL's which have been identified more than once during the entire web crawl.

Figure 9:
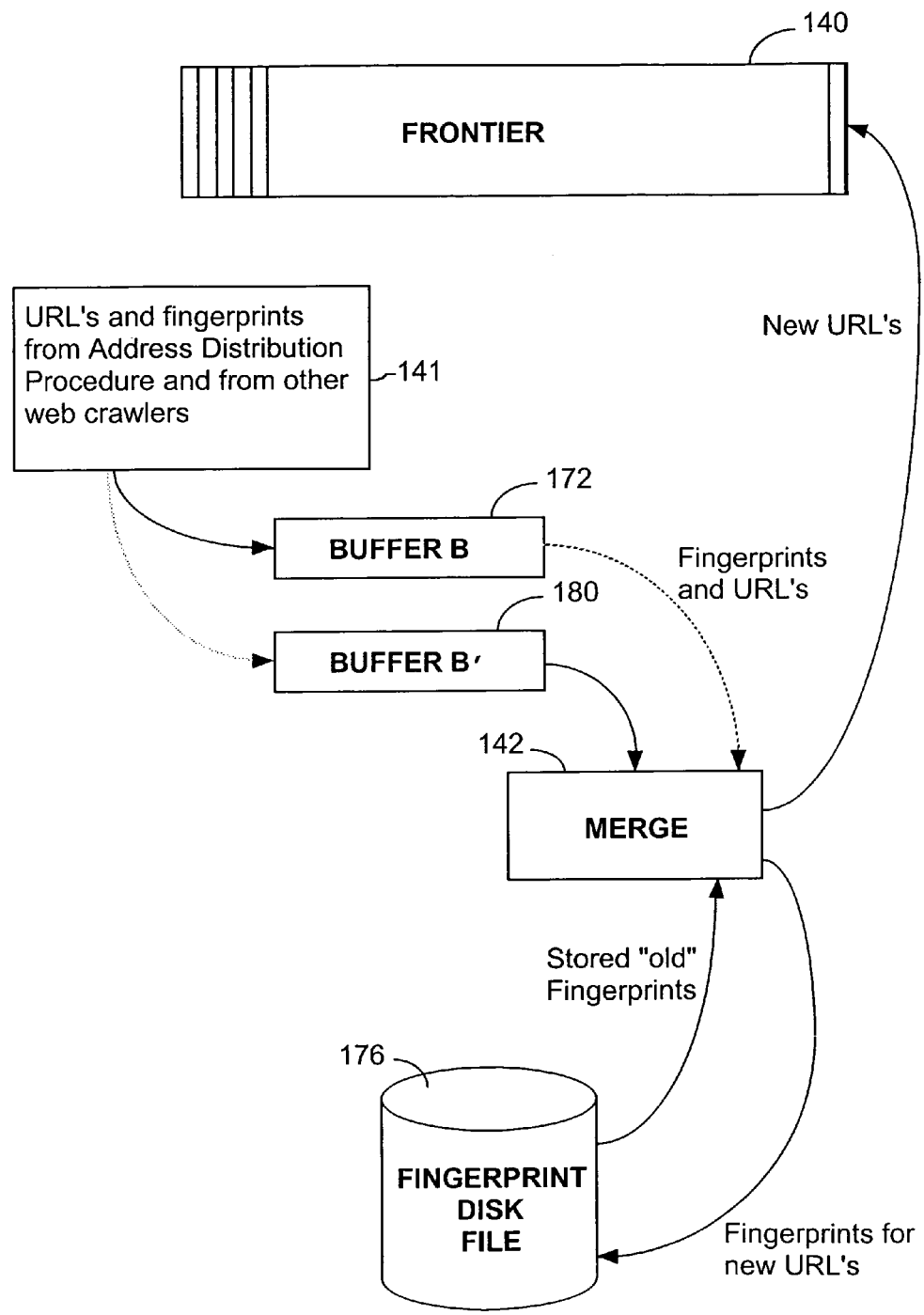
FIG. 9 is a block diagram of the data flow of an alternate embodiment of the address filter procedure.

Another alternative embodiment is illustrated in FIG. 9. When buffer B 172 is full, it must be merged 142 with the fingerprint disk file 176, and cannot accept any newly-identified URL's. Hence, when using the embodiment shown in FIG. 7 or FIG. 8, no new addresses can be accepted for filtering while the time-consuming merge process is in progress. To avoid delaying the address filtering procedure during the merge process, in the embodiment shown in FIG. 9 the address filter uses a second buffer B' 180 in addition to the buffer B 172. In this embodiment, buffer B' 180 is one of the data structures 113 (FIG. 2) used to store known addresses. While buffer B 172 is being merged with the disk file 176, buffer B' 180 takes over the role of buffer B 172. Fingerprints for newly-identified URL's are compared with the contents of buffer B' 180 and then stored in buffer B' 180 if it is determined that the fingerprints are not already stored in buffer B' 180. When buffer B' is full, the two buffers change roles again.

The cache C 174 of the embodiment in FIG. 8 can also be used in the embodiment shown in FIG. 9. The addition of cache C makes use of the buffer B 172/180 more efficient, while the use of two buffer B's 172, 180 greatly reduces the "cost" of the buffer merge operations in terms of the web crawler's ability to process discovered URL's that may or may not be new URL's.

In yet another alternate embodiment, the list of known addresses is maintained in a hash table in main memory (i.e., not on disk). This embodiment is useful primarily in systems used to crawl Intranets, but can also be used in web crawler systems where the cost of having a very large main memory (e.g., several gigabytes of random access memory) is economically worthwhile. The advantage of keeping the list of known addresses entirely in main memory is speed of operation, while the disadvantage is cost.

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of downloading data sets by a plurality of web crawlers from among a plurality of host computers, comprising the steps of:
    assigning a web crawler identifier to each one of the plurality of web crawlers;
    for each respective web crawler:
        downloading at least one data set that includes addresses of one of more referred data sets;
        identifying the addresses of the one or more referred data sets, wherein each identified address includes a host computer identifier;
        for each identified address:
            generating a representation of the host computer identifier;
            determining a web crawler identifier to which the representation corresponds; and
            when the determined web crawler identifier is not assigned to the respective web crawler, sending the identified address to the web crawler to which the determined web crawler identifier is assigned.

2. The method of claim 1, wherein
    the plurality of web crawlers consists of n web crawlers; and
    generating the representation includes computing a hash function of the host computer identifier to generate an integer value that is a member of a set of n predefined distinct values.

3. The method of claim 1, wherein
    the plurality of web crawlers consists of n web crawlers; and
    generating the representation includes computing a hash function of the host computer identifier to generate an intermediate value V, and computing V modulo n.

4. The method of claim 1, wherein the sending step includes:
    determining a web crawler address for the web crawler to which the determined web crawler identifier is assigned;
    transmitting the identified data set address to the destination web crawler at the determined web crawler address.

5. The method of claim 1, wherein each respective web crawler includes multiple threads to download and process documents from a plurality of host computers.

6. A computer program product for use in conjunction with a web crawler system wherein each web crawler is assigned a web crawler identifier, the computer program product comprising a computer readable storage medium and a computer program mechanism embedded therein, the computer program mechanism comprising:
    a main web crawler module for downloading and processing data sets stored on a plurality of host computers, the main web crawler module identifying addresses of the one or more referred data sets in the downloaded data sets, wherein each identified address includes a host computer identifier; and
    an address distribution module for processing the identified addresses, the address distribution module including instructions for:
        generating a representation of the host computer identifier, wherein the representation corresponds to one of the web crawler identifiers;
        determining a web crawler identifier to which the representation corresponds; and
        when the determined web crawler identifier is not assigned to the respective web crawler, sending the identified address to a destination web crawler comprising the web crawler to which the determined web crawler identifier is assigned.

7. The computer program product of claim 6, wherein:
    the web crawler system consists of n web crawlers; and
    the address distribution module's instructions for generating the representation includes instructions for computing a function of the host computer identifier to generate an integer value that is a member of a set of n predefined distinct values.

8. The computer program product of claim 6, wherein:
    the web crawler system consists of n web crawlers; and
    the address distribution module's instructions for generating the representation includes instructions for computing a hash function of the host computer identifier to generate an intermediate value V, and computing V modulo n.

9. The computer program product of claim 6, further comprising:
    a web crawler interface for transmitting the identified address to the destination web crawler and for receiving identified addresses from each of the plurality of web crawlers other than the respective web crawler.

10. The computer program product of claim 6, further comprising:
    a lookup table storing for each of the plurality of web crawler identifiers a corresponding web crawler address, said lookup table for use by the address distribution module in determining a web crawler address to which to send the identified data set address.

11. The computer program product of claim 6 wherein each web crawler includes multiple threads.

12. The computer program product of claim 11 wherein each thread executes a main web crawler module.

13. A web crawler system for downloading data set addresses from among a plurality of host computers, comprising:

a plurality of web crawlers, wherein each web crawler has been assigned a web crawler identifier;

for each respective web crawler:

a main web crawler module for downloading and processing data sets stored on a plurality of host computers, the main web crawler module identifying addresses of the one or more referred data sets in the downloaded data sets, wherein each identified address includes a host computer identifier; and an address distribution module for processing the identified addresses, the address distribution module including instructions for:

generating a representation of the host computer identifier, wherein the representation corresponds to one of the web crawler identifiers;

determining a web crawler identifier to which the representation corresponds; and when the determined web crawler identifier is not assigned to the respective web crawler, sending the identified address to a destination web crawler comprising the web crawler to which the determined web crawler identifier is assigned.

14. The web crawler system of claim 13 wherein the plurality of web crawlers consists of n web crawlers; and the address distribution module's instructions for generating the representation includes instructions for computing a hash function of the host computer identifier to generate an intermediate value V, and computing V modulo n.

15. The web crawler system of claim 13, further comprising:

for each respective web crawler, a web crawler interface for transmitting the identified address to the destination web crawler and for receiving identified addresses from each of the plurality of web crawlers other than the respective web crawler.

16. The web crawler system of claim 13, further comprising:

for each respective web crawler, a lookup table storing for each of the plurality of web crawler identifiers a corresponding web crawler address, said lookup table for use by the address distribution module in determining a web crawler address to which to send the identified data set address.

17. The web crawler system of claim 13 wherein each of the plurality of web crawlers includes multiple threads to download and process documents from a plurality of host computers.

* * * * *